(12) United States Patent
Gyde et al.

(10) Patent No.: US 7,030,892 B1
(45) Date of Patent: Apr. 18, 2006

(54) METHODS AND APPARATUS FOR DISPLAYING INFORMATION

(75) Inventors: Mike G. Gyde, Cave Creek, AZ (US);
Mark I. Snyder, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 734 days.

(21) Appl. No.: 09/680,776

(22) Filed: Oct. 6, 2000

Related U.S. Application Data

(60) Provisional application No. 60/233,825, filed on Sep. 19, 2000.

(51) Int. Cl.
*G09G 5/00* (2006.01)
*G06F 3/00* (2006.01)
*G06F 19/00* (2006.01)

(52) U.S. Cl. .................. 345/635; 715/792; 715/771; 701/14

(58) Field of Classification Search ............. 345/619; 315/792, 800, 815, 793, 1.1; 715/771; 701/14; 340/971, 963, 945, 973, 984
See application file for complete search history.

(56) References Cited

U.S. PATENT DOCUMENTS

| | | | | |
|---|---|---|---|---|
| 4,371,870 A | * | 2/1983 | Biferno ................. | 345/4 |
| 4,823,108 A | * | 4/1989 | Pope .................... | 715/806 |
| 4,988,996 A | * | 1/1991 | Ito ...................... | 340/984 |
| 4,999,780 A | * | 3/1991 | Mitchell ................ | 701/16 |
| 5,060,170 A | * | 10/1991 | Bourgeois et al. ........ | 715/788 |
| 5,371,847 A | * | 12/1994 | Hargrove ............... | 345/788 |
| 5,931,874 A | | 8/1999 | Ebert et al. ............ | 701/1 |
| 6,072,473 A | * | 6/2000 | Muller et al. ........... | 345/173 |
| 6,104,969 A | | 8/2000 | Beeks .................. | 701/1 |
| 6,112,141 A | * | 8/2000 | Briffe et al. ........... | 701/14 |
| 6,281,810 B1 | * | 8/2001 | Factor ................. | 340/971 |
| 6,466,235 B1 | * | 10/2002 | Smith et al. ............ | 345/771 |
| 2001/0055029 A1 | * | 12/2001 | Nakajima et al. ......... | 345/629 |
| 2003/0025719 A1 | * | 2/2003 | Palmer et al. ........... | 345/700 |

FOREIGN PATENT DOCUMENTS

EP  0 763 714 A2  3/1997

OTHER PUBLICATIONS

Microsoft® Excel 2000 Screen Print.*

* cited by examiner

*Primary Examiner*—Ryan Yang
(74) *Attorney, Agent, or Firm*—Andrew A. Abeyta

(57) ABSTRACT

A display system according to various aspects of the present invention provides systems and methods for an integrated graphical user interface which facilitates the interactive and dynamic display aircraft data. In accordance with various aspects of the present invention, a user (e.g., a pilot) provides input to a processor and receives visual feedback via a display produced by one or more monitors. The display includes various graphical elements according to the operator's commands and a predetermined set of rules. By adjusting the information on the display, the user may view the desired information according to the operator's current needs and interests.

17 Claims, 6 Drawing Sheets

METHODS AND APPARATUS FOR DISPLAYING INFORMATION

CROSS-REFERENCE TO RELATED APPLICATION

This application claims priority from and the benefit of U.S. Provisional Patent Application Ser. No. 60/233,825, filed Sep. 19, 2000, entitled "Method and Apparatus for Controlling an Aircraft", the contents of which are hereby incorporated by reference.

BACKGROUND OF THE INVENTION

1. Technical Field

The present invention relates, generally, to displays and, more particularly, to displaying and adjusting information on a display.

2. Background Information

Aircraft flight displays continue to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20–88A, *Guidelines on the Marking of Aircraft Powerplant Instruments* (September 1985).

One area in particular that has not significantly profited from advances in graphical user interfaces is the field of aircraft display systems. Specifically, in current generation aircraft, information display and editing continues to be performed using conventional analog instruments and/or cumbersome, text-based techniques which have not changed significantly in the preceding several years. For example, flight crews frequently indicate that current flight management systems (FMS) are non-intuitive, difficult to interpret, and require too much heads-down time. Indeed, due to the high cockpit workload involved, many flight crews abandon the FMS altogether, choosing instead to fly the aircraft using the autopilot.

One concept in aircraft cockpits is to consolidate information on electronic displays. Addition of input devices creates interactive systems which may be used to control and monitor various aspects of the aircraft, such as flight management, navigation, cabin conditions, and sensors. The potential for display failure, however, requires system redundancy. For example, if a display fails, another source of the relevant information should be available to the crew. Further, the information should be available without significant obstacles or difficulty. Consequently, the requirement for redundancy tends to limit the application of electronic displays in many aircraft.

BRIEF SUMMARY OF THE INVENTION

A display system according to various aspects of the present invention provides systems and methods for an integrated graphical user interface which facilitates the interactive and dynamic display aircraft data. In accordance with various aspects of the present invention, a user (e.g., a pilot) provides input to a processor and receives visual feedback via a display produced by one or more monitors. The display includes various graphical elements according to the operator's commands and a predetermined set of rules. By adjusting the information on the display, the user may view the desired information according to the operator's current needs and interests.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF PREFERRED EXEMPLARY EMBODIMENTS

Systems and methods in accordance with various aspects of the present invention provide an improved graphical user interface for display and control of aircraft information. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Various conventional techniques and components are not described in detail herein.

Figure 1:
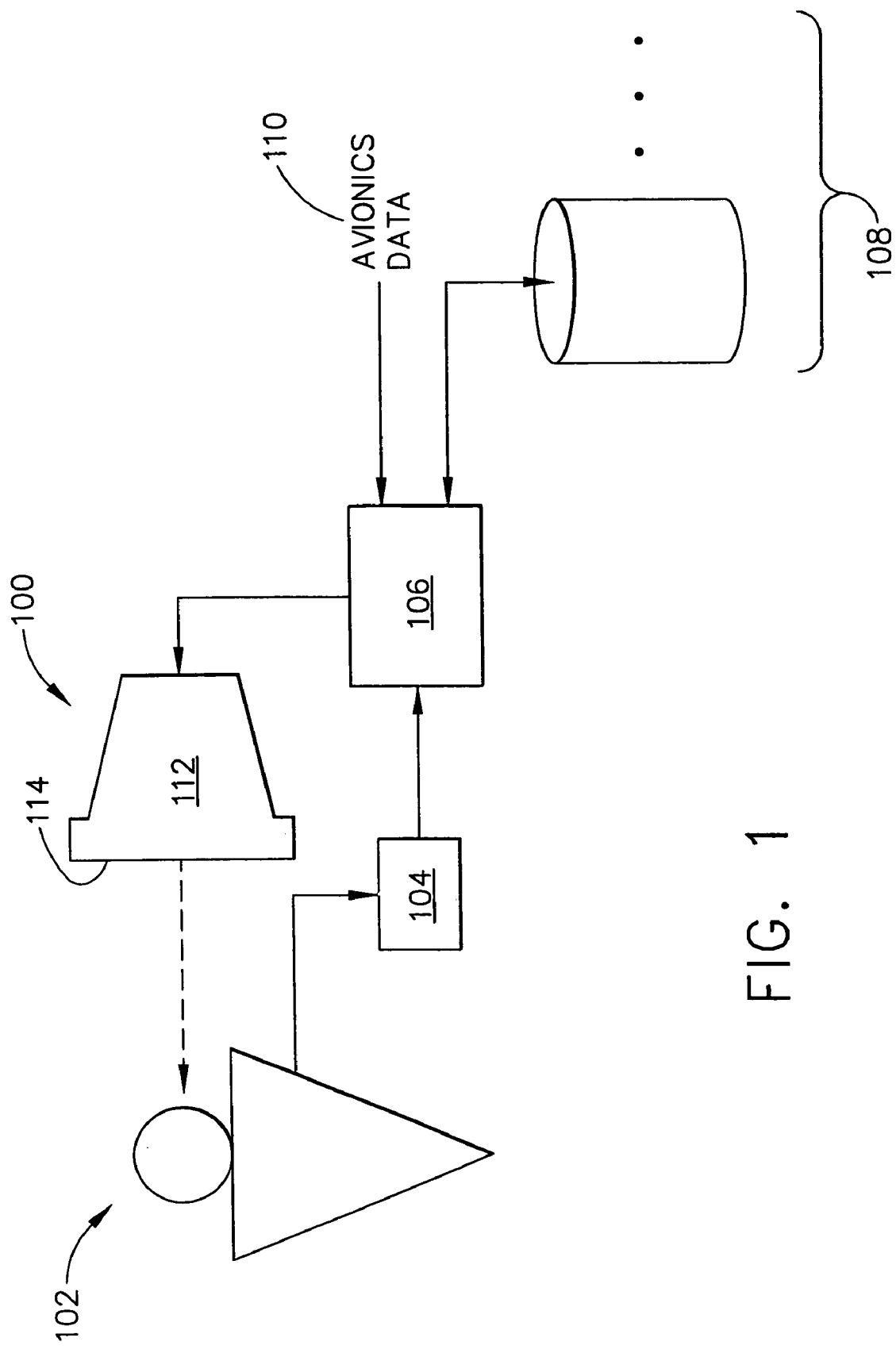
FIG. 1 is a schematic overview of a display system in accordance with various aspects of the present invention.

Briefly, referring now to FIG. 1, a display system 100 in accordance with various aspects of the present invention comprises a processor 106 configured to communicate with an associated monitor (or monitors) 112, one or more data sources 108, a user input system 104, and avionics data 110. In general, a user 102 (e.g., a pilot) provides input to processor 106 through user input system 104, and receives visual feedback via a display 114 produced by monitor 112. Display 114 includes various graphical elements associated with, for example, the lateral position, vertical position, flight-plan and/or other indicia of the aircraft's operational state as determined from avionics data 110 and/or data sources 108. Through use of user input system 104, user 102 may modify the information displayed and control the operation of the aircraft in accordance with feedback provided by display 114.

User input system 104 facilitates transfer of data from the user 102 to the other components of the display system 100. User input system 104 may include any appropriate device configured to accept input from user 102 and affect the display 114. For example, the user input system 102 may include one or more switches, dials, or other input devices. In the present embodiment, the user input system includes a tracking device, a select button, and a menu button. The tracking device converts input actions from the user 102 to move a graphical cursor on the display 114. Various joysticks, mice, trackballs, and the like are suitable for this purpose.

The select button facilitates interaction with the display system 100, such as using conventional "clicking" and "double-clicking" on selections designated by a cursor. The select button may comprise any suitable mechanism for providing signals to the display system 100, such as a keypad, a button, or a switch. Similarly, the menu button comprises a mechanism for requesting menus. In the present embodiment, the user 102 depresses the menu button to cause the display to present a modification mechanism or modification interface, such as a menu of options or other information. The modification interface, however, may comprise any suitable system or mechanism to facilitate modification of the display 114. Like the select button, the menu button may comprise any suitable mechanism for requesting the modification interface, such as a keypad, a button, or a switch.

In the present embodiment, user control system 104 comprises an integrated input system including a trackball in the tracking device, the select button, and the menu button. The user 102 rests his or her hand on a built-in palm-rest to stabilize the hand, positioning the fingertips over the trackball to manipulate the cursor and the thumb over the select button for clicking.

Figure 2:
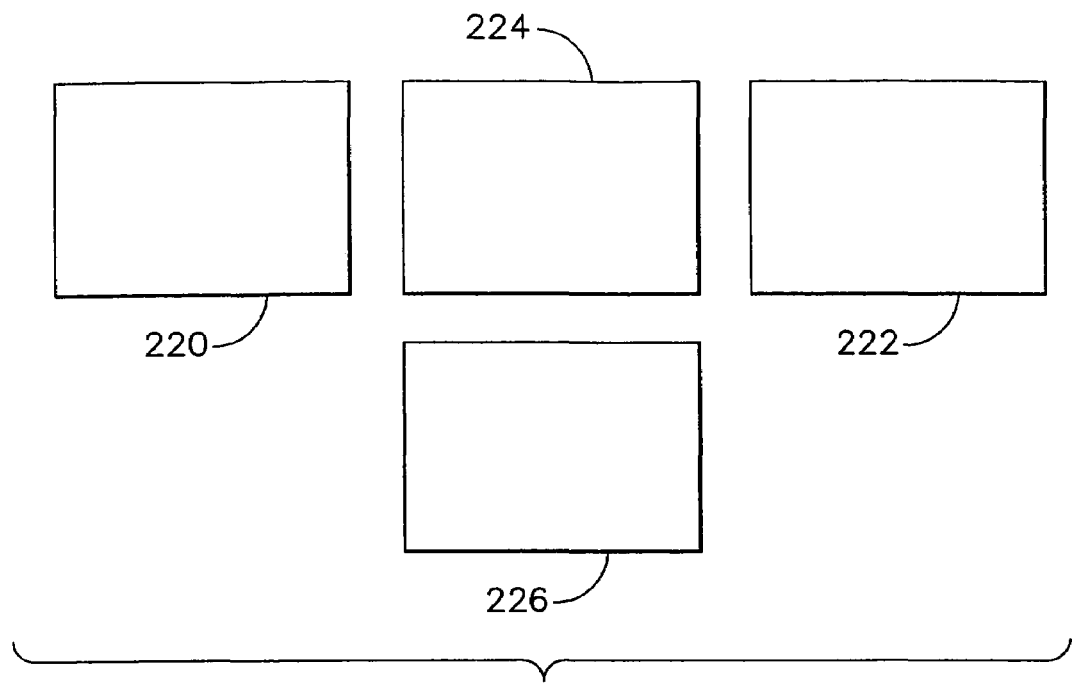
FIG. 2 is a schematic overview of a display arrangement in accordance with one embodiment of the present invention.

Monitor 112 may include any display monitor suitable for displaying the various symbols and information. Any appropriate display and configuration may be implemented, including multiple CRT and flat-panel display systems. Referring briefly to FIG. 2, the present display system suitably includes four individual liquid crystal displays, including a pilot-side display 220, a copilot-side display 222, an upper center display 224, and a lower center display 226. Each display of the present embodiment comprises a 10-inch by 14-inch LCD.

Processor 106 encompasses one more functional blocks used to provide flight management and control, interface with cursor control device 104, and drive monitor 112. The processor 106 and the other components may communicate among themselves in any appropriate manner, such as via conventional wiring and the like. Processor 106 may include any number of individual microprocessors, memories, storage devices, interface cards, and other computers, controllers, or the like. Avionics data 110 includes information related to the state of the aircraft, such as airspeed, altitude, and throttle settings. Data sources 108 include various types of display content required by the system or desired for the particular application, for example, flight plan data, data related to airways, navigational aids (Navaids), symbol textures, navigational data, obstructions, font textures, taxi registration, Special Use Airspace, political boundaries, COM frequencies (enroute and airports), approach info, and the like. Display contents comprise any suitable sets of information to be displayed to the user 102, including, for example, an interactive navigation (I-Nav) map, waypoint list, primary flight data, configuration data, sensors data, checklists, electrical systems data, hydraulic systems data, and synoptic displays.

Figure 3A:
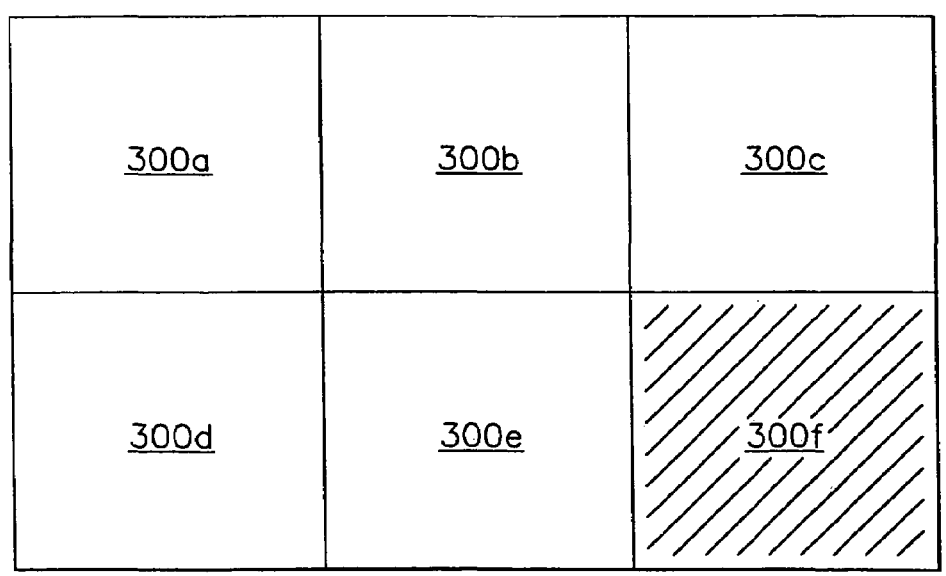
FIGS. 3A through 3F depict possible display panel sizes and orientations.
Figure 3B:
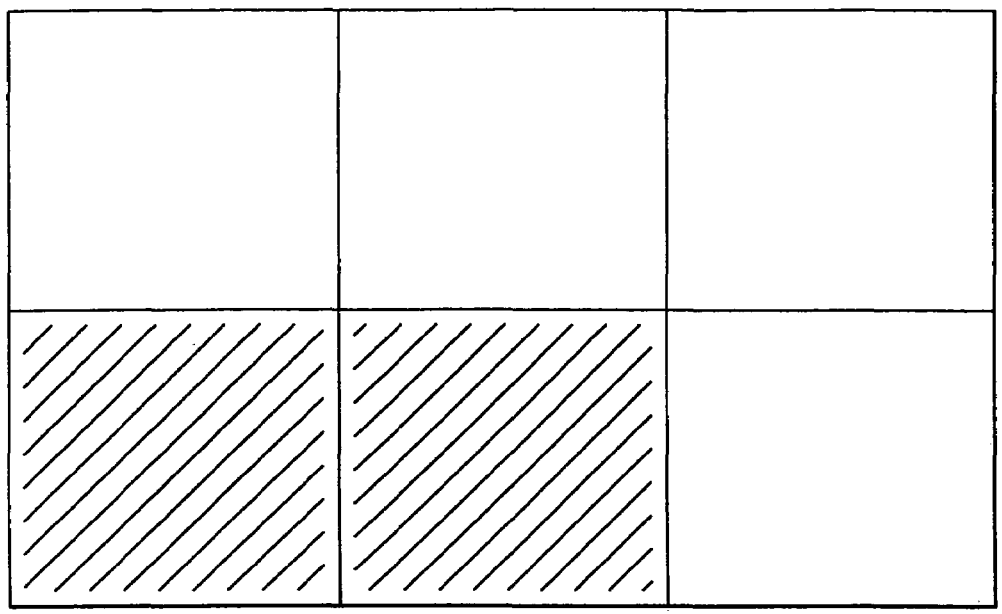
Figure 3C:
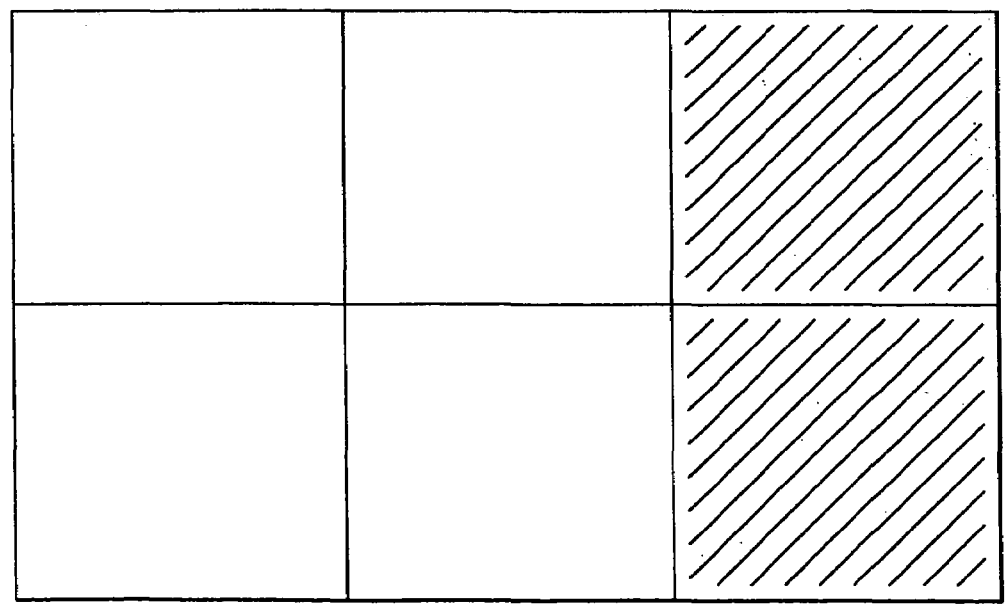
Figure 3D:
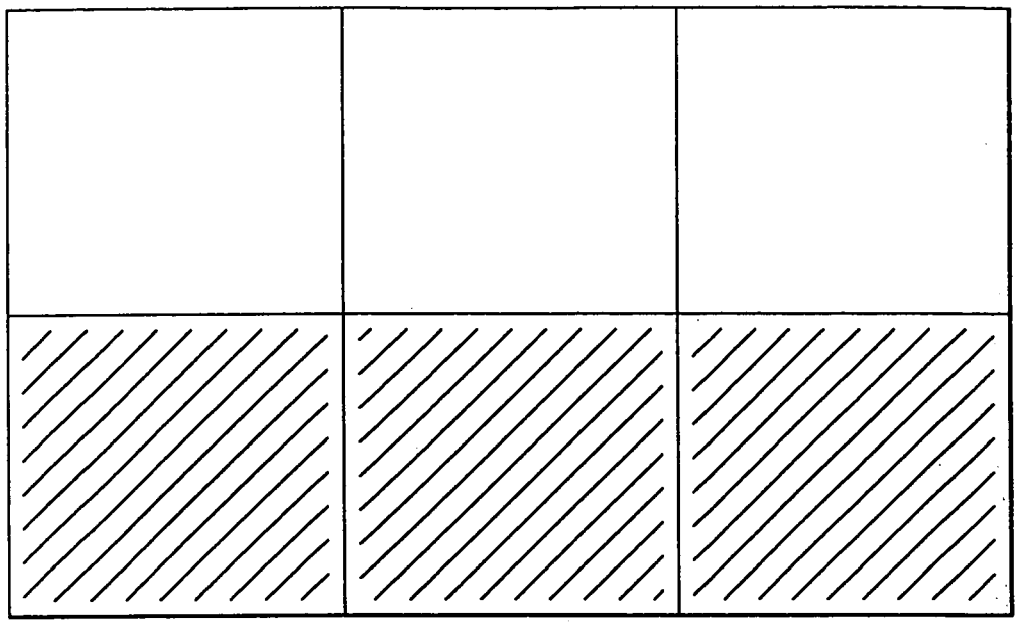
Figure 3E:
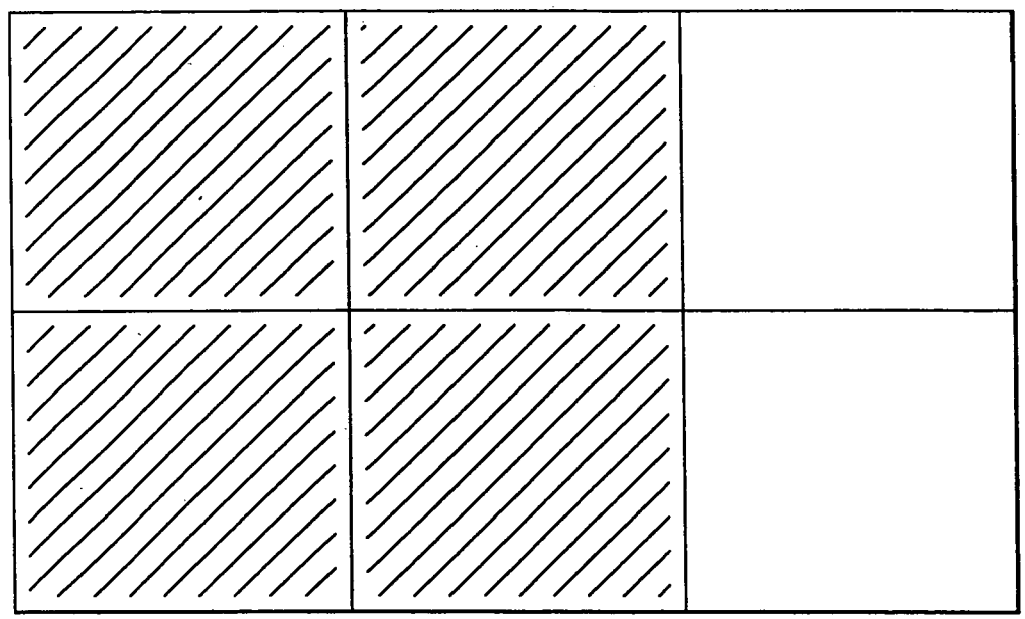
Figure 3F:
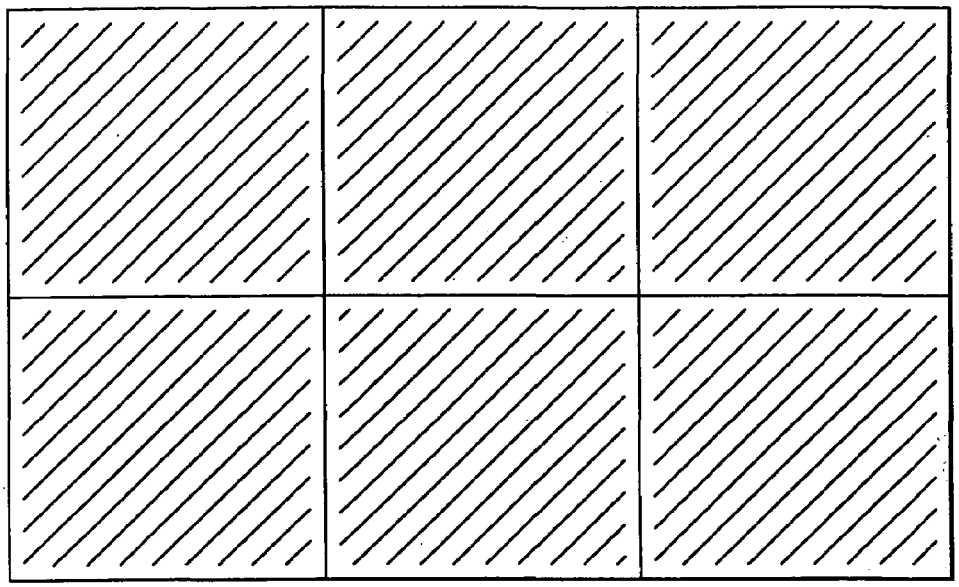

The various types of display content are displayed on the LCDs to provide information to the user 102. Information is rendered on the displays 114 in graphical panels, which are provided in a limited number of sizes. Referring now to FIGS. 3A through 3F (in which the hatching indicates the relevant portion of the display 114), each display 114 is graphically subdivided into six substantially equal portions 300*a–f*, having a top row of three portions 300*a–c* and a bottom row of three portions 300*d–f*. In the present embodiment, the possible sizes and configurations for the various panels are ⅙ (FIG. 3A), ⅓-horizontal (FIG. 3B), ⅓-vertical (FIG. 3C), ½-horizontal (FIG. 3D), ⅔-vertical (FIG. 3E), and full screen (FIG. 3F). Various combinations of individual ⅙ panels may be used to create the larger panel sizes. Further, the location of each panel may be configured while maintaining the size and orientation of the panel. For example, a ½-horizontal panel may be situated along the top row (300*a–c*) or the bottom row (300*d–f*) of the display 114. The display is suitably split for most display operations into a top ⅓-horizontal area (300*a*, 300*b*), a bottom ⅓-horizontal area (300*d*, 300*e*), and two ⅙ portion area (300*c*, 300*f*). Combinations of these four areas may be used to generate any of the possible sizes and configurations.

The panels may be subject to various predetermined display rules to control the display system. For example, in the present embodiment, the panels cannot be moved by click-and-drag operations and cannot overlap. Further, the panels suitably cannot be resized except in accordance with the pre-assigned sizes of the panels.

The particular panel size used to display a particular type of display content may be selected according to any suitable criteria. In the present embodiment, a limited selection of sizes corresponds to each type of display content. Thus, each type of display content is pre-assigned to one or more possible panel sizes according to, for example, the viewability of the data, the importance of the information to flight operations, and/or the volume of information to be presented. For example, one type of display content is an I-Nav map that provides a map of the terrain over which the aircraft is flying as well as various other flight information, such as waypoints, flight path, flight hazards, and weather cells. Because of the amount of information and detail provided in the I-Nav map, it may be rendered in a selection of large panels, such as full screen, ⅔-vertical, or ⅓-horizontal. Radio information, on the other hand, is available only in the ⅙, ⅓-horizontal, or ⅓-vertical panel sizes, because the radio information includes less data for display and is relatively easily viewable on smaller panels. Other sets of information, such as FMS data and waypoint lists, may also be similarly assigned a limited selection of panel sizes.

A display system 100 according to various aspects of the present invention facilitates modification of the information on the display 114 according to various circumstances, such as user settings and/or aircraft conditions. Dynamic selection of the information displayed on each of the various LCDs 200–206 allows the user to display desired information and hide information that is not currently being used. In addition, changing the display content on the LCDs 200–206 allows information to be provided to the user in the event that one or more LCDs 200–206 fails. For example, in normal operation, primary flight data may be provided to the pilot on the pilot-side LCD 200. If the pilot-side LCD 200 fails, however, the display 114 of another LCD, such as the upper center LCD 204, may be adjusted to provide the primary flight data.

The display content provided on each of the LCDs 200–206 may be automatically changed by the processor 106 under certain circumstances. The processor 106 is suitably configured to automatically detect one or more failed LCDs 200–206 and adjust the information provided on the remaining operating LCDs. Thus, information that is provided on one of multiple LCDs 200–206 under normal operating conditions may be provided to the user 102 on one or two displays under abnormal conditions, upon user 102 selection, or under other appropriate conditions as desired.

For example, if the pilot-side LCD 200 fails (such as due to backlight or display driver system failure), high priority information, such as the attitude direction indicator (ADI), may displace lower priority information and be automatically displayed on the upper center LCD 204. Thus, the most important data to the pilot is substantially immediately available. The display content previously displayed on the upper center LCD 204 may be removed, automatically provided on a smaller panel, or automatically provided on another LCD. The processor 106 may be further configured to adjust the display content of the various LCDs 200–206 under any conditions and in accordance with any desired criteria. For example, in the present embodiment, the display system 100 is configured to automatically provide the ADI to the user 102 controlling the aircraft. Accordingly, if the crew transfers control of the aircraft from the pilot to the copilot, the copilot-side LCD 202 is automatically reconfigured to display the ADI.

Figure 4:
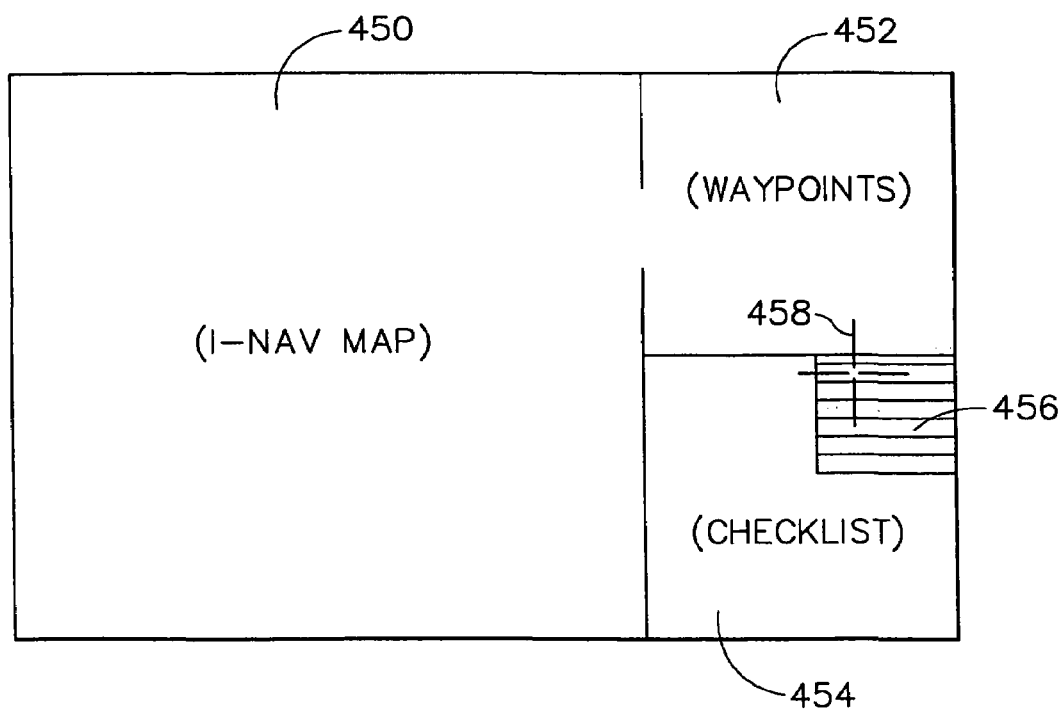
FIG. 4 depicts a display having multiple display panels, a menu, and a cursor.

The content of the various displays 114 is also suitably configured and selectively modified by the user 102. Each display 114 of each LCD 200–206 is suitably configured to selectively display all or a portion of the various types of display content. The display content may be controlled in any suitable manner. Referring to FIG. 4, in the present embodiment, the user 102 may modify the display content using the input control system 104. A particular display 114 may include the I-Nav map 450, a waypoints list 452, and a checklist 454. To change the display 114, the user 102 positions manipulates the tracking device to position the cursor over a selected panel 450–454 or other portion 300a–f of the display 114. Each panel 450–454 may be highlighted, such as with a differently colored border, as the cursor passes over the panel to indicate which panel is currently designated by the cursor.

When the cursor is in position, the user 102 activates the menu button, which causes the display 114 to present a menu of display options. For example, if the user 102 wants to change a checklist panel 454 to another selection, the cursor is placed over the checklist panel 454 and the menu button is depressed. A menu 456 of relevant options opens at any suitable location, such as in the upper right-hand corner of the checklist panel 454. In addition, the display 114 may automatically reposition the cursor 458, such as at the top or center of the menu 456. The menu 456 includes one or more options for altering the checklist panel 454. For example, the menu 456 suitably includes a list of other display content candidates that may be selected for display, such as waypoints, checklists, I-Nav map, radio settings, and ADI. The user 102 positions the cursor 458 over the desired selection and activates the select button. The display 114 then displays the selected display content.

Figure 5A:
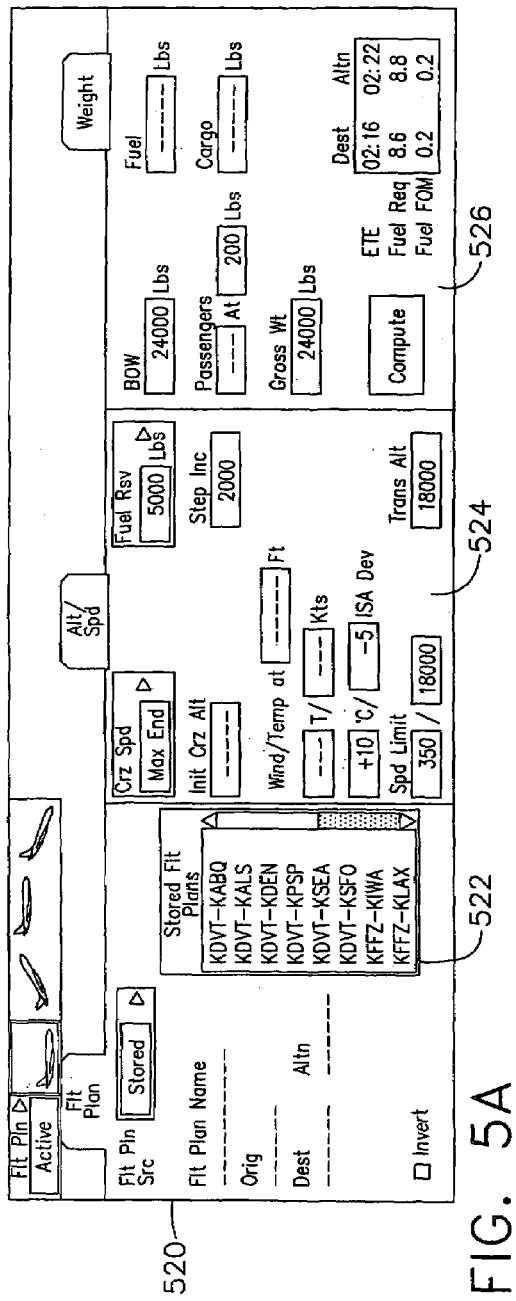
FIGS. 5A and 5B depict an exemplary display panel in an expanded and contracted form.
Figure 5B:
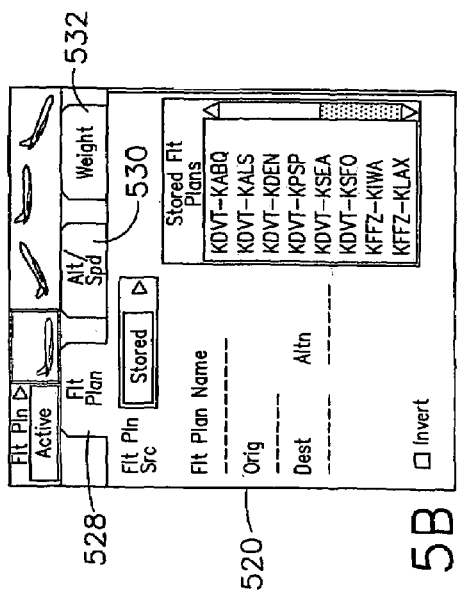

The menu 456 may further include various options for modifying the presentation of the information in the display 114. For example, referring to FIGS. 5A and 5B, the display panel may display a flight management data panel 520 in a ½-horizontal panel. The flight management data may comprise a first ⅙ portion with flight plan information 522, a second ⅙ portion showing altitude and speed data 524, and a third ⅙ portion displaying weight information 526. If the user 102 wants to reduce the size of the flight management data panel 520 but continue to have relatively quick access to the flight management data, the user 102 selects a "contract" option from the display panel menu. The display 114 then displays one of the three ⅙ portions 522–526, such as a default portion or a user-designated portion, in a ⅙ panel. The other two portions are hidden, but may be accessible to the user 102 in any appropriate manner, such as via another modification interface. For example, the ⅙ panel may include additional tabs 528, 530, 532 that may be selected by the user 102 by positioning the cursor over the desired tab and activating the select button. Instead of expanding the ⅙ panel to a larger size, however, the display 114 hides the original information in the ⅙ panel and presents the selected information in the same panel.

The display system 100 may be configured in any suitable manner to facilitate the size selection, contraction, and expansion of the various panels. In addition, the size of the panel may be selected by the user 102, automatically provided by the display system 100, or otherwise controlled according to any appropriate criteria or combination thereof. For example, in an alternative embodiment, the display 114 automatically combines two panels when the same panel is selected in an allowed location. For instance, to create a ½-across FMS panel from a ⅙ panel, the user 102 suitably selects the ⅓-across panel adjacent the ⅙ panel. The user 102 then depresses the menu button and selects "FMS", the same selection as in the adjacent ⅙ panel. The display 114 automatically combines the ⅙ panel and the ⅓-across panel to create a single ½-across FMS panel. Thus, the "expand" and "contract" selections may be omitted from the menu.

The display configuration and the options available to the user 102, such as the options presented via the menus, may be controlled according to a predetermined set of rules. The rules may be selected according to appropriate criteria, such as safety considerations, cockpit regulations, flight deck characteristics, and the like. The display system 100 of the present embodiment operates in conjunction with various rules to enhance the safe and efficient operation of the aircraft and to present a cohesive and intuitive display 114. For example, the display system 100 of the present embodiment presents different menus option on for different LCDs 220–226, display panels, display contents, and operating conditions.

In the present embodiment, certain LCDs 220–226 may only display certain display contents except under specific conditions. Similarly, certain LCDs 220–226 may be required to display certain display contents except under particular conditions. For example, under normal operating conditions (e.g., all of the LCDs 220–226 are operating), the ADI is displayed on either the pilot-side LCD 220 or the copilot-side LCD 222, depending on which member of the crew is currently controlling the aircraft. In addition, the ADI is shown on at least one other LCD 220–226 at all times under normal operating conditions. Under abnormal operating conditions, however, such as due to failure of one or more LCDs 220–226, the rule requiring the ADI to be shown on at least two LCDs 220–226 may be changed to accommodate the need for all of the information to be displayed on fewer than all four LCDs 220–226. Other rules, however, may be automatically instituted. For example, the ADI may be required to be shown on at least one LCD 220–226 at all times.

The options for configuring the various displays 114 may also be subject to rules based on which portion of the display 114 is selected. For example, certain display content may only be presented in the lower right corner location. Thus, such display content does not appear as an option on any menu except for the lower right panel. In addition, the menu may not include options for display content that is already being displayed on another LCD 220–226. For example, if the flight management system (FMS) display content is already displayed on the upper center LCD 224, the option does not appear on any menu. This feature may be suitable for certain display contents, whereas other display contents may be redundantly displayed.

The options may also be limited according to the available sizes for various display contents. For example, the I-Nav map in the present system is available in the ⅓-horizontal configuration, but cannot be reduced to ⅙. Accordingly, the menu associated with the I-Nav map display content does not include a "contract" or "⅙" option.

Changes in the displays 114 may be further subject to a set of predetermined defaults and a modification hierarchy. The defaults determine how information is displayed in the absence of other instructions from the user 102. For example, when the user 102 selects the I-Nav map display content, the default setting may be for a ⅔-vertical panel. Accordingly, the display 114 automatically provides the I-Nav map on a ⅔-vertical panel unless the user 102 indicates otherwise. User indications to the contrary may be express (e.g. via menu selection) or implied (e.g. selection via the menu for the bottom ⅓-horizontal panel). Further, the modification hierarchy may affect the presentation of data. For example, if the user 102 selects the I-Nav map, the display system 100 may be configured to automatically hide certain information, such as low priority information like radio data and or checklists, to present the I-Nav map. More important information, however, such as the ADI, may be preserved or reduced, and the I-Nav map then initially presented on a smaller panel. This is particularly advantageous for cockpit applications, such as those involving FMS data, waypoints lists, I-Nav maps, and the like, in which larger displays are preferable, but the option of providing the information in a smaller window is suitably preferred.

Although the invention has been described herein in conjunction with the appended drawings, the scope of the invention is not so limited. Modifications in the selection, design, and arrangement of the various components and steps discussed herein may be made without departing from the scope of the invention as set forth in the appended claims.

What is claimed is:

1. An avionics display comprising a plurality of panels, wherein at least one of the panels is selectively configurable to have a size corresponding to one of a limited set of non-user-defined sizes, wherein the limited set of sizes is ⅙, ⅓, ½, ⅔, and ⅔ of the display, wherein each of the plurality of panels is configured to display a display content, the display content pre-assigned to a subset of sizes of the limited set of sizes based on a pre-determined flight condition priority, and wherein each of the plurality of panels is configured to be located on the avionics display based on the pre-determined flight condition priority.

2. A display according to claim 1, wherein the at least one of the panels presents a first selected display content of a plurality of display contents, and further comprising a modification interface for changing at least one of the selected display content and the size of the panel.

3. A display according to claim 2, wherein the modification interface comprises at least one of a menu and a plurality of tabs.

4. A display according to claim 1, wherein the at least one of the panels presents a selected display content of a plurality of display contents, and wherein the limited set of sizes corresponds to the selected display content.

5. A cockpit display system, comprising:
   (a) a plurality of monitors configured to display a plurality of sets of information; and
   (b) a processor communicating with the plurality of monitors, wherein the processor is configured to provide a plurality of displays to the plurality of monitors, wherein each of the displays comprises a plurality of panels, wherein at least one of the panels is selectively configurable to have a size corresponding to one of a limited set of non-user-defined sizes, and wherein the limited set of sizes is ⅙, ⅓, ½, ⅔, and ⅔ of the display, wherein each of the plurality of panels is configured to display a display content, the display content pre-assigned to a subset of sizes of the limited set of sizes based on a pre-determined flight condition priority, and wherein each of the plurality of panels is configured to be located on the display based on the pre-determined flight condition priority.

6. A cockpit display system according to claim 5, wherein the processor provides a first set of information to a first monitor and a second set of information to a second monitor, and wherein the processor is configured to provide the second set of information to the fist monitor if the second monitor fails.

7. A cockpit display system according to claim 6, wherein the processor displays the first set of information in a first panel on the first monitor and reduces the size of the first panel if the second monitor fails and displays the second set of information in a second panel on the first monitor if the second monitor fails.

8. A cockpit display system according to claim 6, wherein the first set of information corresponds to a first priority and the second set of information corresponds to a second priority, and wherein the processor is configured to provide the second set of information to the first monitor if the second monitor fails only if the second priority is higher than the first priority.

9. A cockpit display system according to claim 5, wherein the at least one of the panels presents a first selected display content of a plurality of display contents, and further comprising a modification interface for changing at least one of the selected display content and the size of the panel.

10. A cockpit display system according to claim 9, wherein the modification interface comprises at least one of a menu and a plurality of tabs.

11. A cockpit display system according to claim 5, wherein the at least one of the panels presents a selected display content of a plurality of display contents, and wherein the limited set of sizes corresponds to the selected display content.

12. A cockpit display system, comprising:
   (a) a plurality of monitors configured to display a plurality of sets of information, wherein each of the plurality of monitors is configured to display the information on a plurality of panels, at least one of the plurality of panels is selectively configurable to have a size selected from a limited set of non-user defined sizes, wherein the limited set of sizes is ⅙, ⅓, ½, ⅔, and ⅗ of wherein each of the sets of information is pre-assigned to a subset of sizes of the limited set of sizes based on a pre-determined flight condition priority, and wherein each of the plurality of panels is configured to be located on the monitor based on the pre-determined flight condition priority; and (b) a processor communicating with the plurality of monitors, wherein the processor provides a first set of information to a first monitor and a second set of information to a second monitor, and wherein the processor is configured to provide the second set of information to the first monitor if the second monitor fails.

13. A cockpit display system according to claim 12 further comprising a modification interface for changing at least one of the information displayed on and the size of the panel.

14. A cockpit display system according to claim 13, wherein the modification interface comprises at least one of a menu and a plurality of tabs.

15. A cockpit display system according to claim 12, wherein the monitors display the information on a plurality of panels having a limited selection of sizes, and wherein the limited selection of sizes corresponds to the information displayed on the panel.

16. A cockpit display system according to claim 12, wherein the processor displays the first set of information in a first panel on the first monitor and reduces the size of the first panel if the second monitor fails and displays the second set of information in a second panel on the first monitor if the second monitor fails.

17. A cockpit display system according to claim 12, wherein the first set of information corresponds to a first priority and the second set of information corresponds to a second priority, and wherein the processor is configured to provide the second set of information to the first monitor if the second monitor fails only if the second priority is higher than the first priority.

\* \* \* \* \*